US012670708B2

(12) United States Patent
Najafi et al.

(10) Patent No.: US 12,670,708 B2
(45) Date of Patent: Jun. 30, 2026

(54) METHOD FOR STOCHASTIC COMPUTING IMAGE PROCESSING USING CORRELATION CONTROLLED CONTINGENCY TABLES

(71) Applicant: UNIVERSITY OF LOUISIANA LAFAYETTE, Lafayette, LA (US)

(72) Inventors: Mohammadhassan Najafi, Lafayette, LA (US); Sercan Aygun, Lafayette, LA (US); Ece Olca Gunes, Lafayette, LA (US)

( * ) Notice: Subject to any disclaimer, the term of this patent is extended or adjusted under 35 U.S.C. 154(b) by 256 days.

(21) Appl. No.: 18/764,804

(22) Filed: Jul. 5, 2024

(65) Prior Publication Data

US 2025/0014325 A1 Jan. 9, 2025

Related U.S. Application Data

(60) Provisional application No. 63/525,603, filed on Jul. 7, 2023.

(51) Int. Cl.

| | |
|---|---|
| ***G06V 10/84*** | (2022.01) |
| ***G06V 10/10*** | (2022.01) |
| ***G06V 10/74*** | (2022.01) |
| ***G06V 10/75*** | (2022.01) |
| ***G06V 10/94*** | (2022.01) |

(52) U.S. Cl.

CPC .............. *G06V 10/84* (2022.01); *G06V 10/16* (2022.01); *G06V 10/751* (2022.01); *G06V 10/761* (2022.01); *G06V 10/955* (2022.01)

(58) Field of Classification Search

CPC ...... G06V 10/84; G06V 10/16; G06V 10/751; G06V 10/761; G06V 10/955; G06V 10/776; G06F 5/01; G06T 5/70; G06T 5/20; G06T 7/13; G06T 7/143; G06T 2207/20192; G06T 2207/20076; G06N 7/06

See application file for complete search history.

(56) References Cited

U.S. PATENT DOCUMENTS

2017/0255225 A1* 9/2017 Lilja ......................... G06T 1/00
2018/0204131 A1* 7/2018 Najafi ...................... G06N 7/01

(Continued)

OTHER PUBLICATIONS

R. Szeliski, Computer Vision: Algorithms and Applications, Springer International Publishing, Jan. 2022, p. 518-528, doi: 10.1007/978-3-030-34372-9 (Year: 2022).*

(Continued)

*Primary Examiner* — Chan S Park
*Assistant Examiner* — Paulo Andres Garcia
(74) *Attorney, Agent, or Firm* — Ted M. Anthony; Sarah B. Dupont

(57) ABSTRACT

Disclosed herein a method for agile simulation of a stochastic computing image processing where the input operands are processed with the aid of a correlation-controlled contingency table (CT) construct without using actual stochastic bit-streams. The disclosed method utilizes contingency tables to perform (i) template matching, (ii) image compositing, and (iii) pattern detection. Results show that the proposed approach achieves similar computation accuracy to the traditional stochastic computing simulation while performing runtime- and memory-efficient computations.

8 Claims, 22 Drawing Sheets

(56) References Cited

U.S. PATENT DOCUMENTS

2019/0289345 A1* 9/2019 Najafi ........................ G06F 7/58
2023/0079389 A1* 3/2023 Vieria De Moraes ........................ A61K 31/352 514/456

OTHER PUBLICATIONS

Aygun, Sercan. (2022). Stochastic Bitstream-Based Vision and Learning Machines. 10.13140/RG.2.2.15234.86728. (Year: 2022).*
J. H. Anderson, Y. Hara-Azumi and S. Yamashita, "Effect of LFSR seeding, scrambling and feedback polynomial on stochastic computing accuracy," 2016 Design, Automation & Test in Europe Conference & Exhibition (Date), Dresden, Germany, 2016, pp. 1550-1555. (Year: 2016).*
T. Adiono, R. F. Armansyah, F. D. Ikram, S. S. Nolika, R. V. W. Putra and A. H. Salman, "Parallel morphological template matching design for efficient human detection application," 2016 (ISPACS), Phuket, Thailand, 2016, pp. 1-4, doi: 10.1109/ISPACS.2016.7824675. (Year: 2016).*
P. Li and D. J. Lilja, "Using stochastic computing to implement digital image processing algorithms," 2011 IEEE 29th International Conference on Computer Design (ICCD), Amherst, MA, USA, 2011, pp. 154-161, doi: 10.1109/ICCD.2011.6081391. (Year: 2011).*
S. Aygun and E. O. Gunes, "Utilization of Contingency Tables in Stochastic Computing," in IEEE Transactions on Circuits and Systems II: Express Briefs, vol. 69, No. 6, pp. 2942-2946, Jun. 2022, doi: 10.1109/TCSII.2022.3146238. (Year: 2022).*
Joe, H.; Kim, Y. Novel Stochastic Computing for Energy-Efficient Image Processors. Electronics 2019, 8, 720. https://doi.org/10.3390/electronics8060720 (Year: 2019).*
Aygun, Sercan & Najafi, M. Hassan & Imani, Mohsen & Gunes, Ece. (2023). Agile Simulation of Stochastic Computing Image Processing With Contingency Tables. IEEE Transactions on Computer-Aided Design of Integrated Circuits and Systems. pp. 1-1. 10.1109/TCAD.2023.3243136. (Year: 2023).*

* cited by examiner

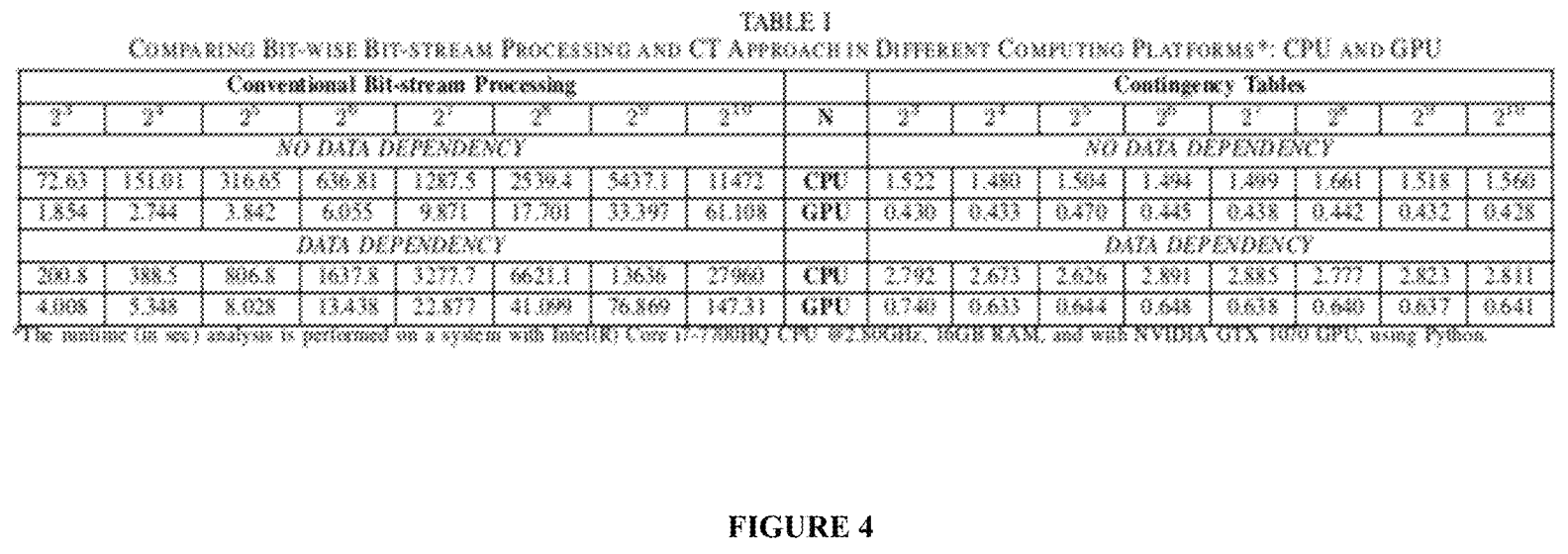

TABLE I

COMPARING BIT-WISE BIT-STREAM PROCESSING AND CT APPROACH IN DIFFERENT COMPUTING PLATFORMS*: CPU AND GPU

| Conventional Bit-stream Processing | | | | | | | | | Contingency Tables | | | | | | | |
|---|---|---|---|---|---|---|---|---|---|---|---|---|---|---|---|---|
| $2^3$ | $2^4$ | $2^5$ | $2^6$ | $2^7$ | $2^8$ | $2^9$ | $2^{10}$ | N | $2^3$ | $2^4$ | $2^5$ | $2^6$ | $2^7$ | $2^8$ | $2^9$ | $2^{10}$ |
| *NO DATA DEPENDENCY* | | | | | | | | | *NO DATA DEPENDENCY* | | | | | | | |
| 72.63 | 151.01 | 316.65 | 636.81 | 1287.5 | 2539.4 | 5437.1 | 11472 | **CPU** | 1.522 | 1.480 | 1.504 | 1.494 | 1.409 | 1.661 | 1.518 | 1.560 |
| 1.854 | 2.744 | 3.842 | 6.055 | 9.871 | 17.701 | 33.397 | 61.108 | **GPU** | 0.430 | 0.433 | 0.470 | 0.445 | 0.438 | 0.442 | 0.432 | 0.428 |
| *DATA DEPENDENCY* | | | | | | | | | *DATA DEPENDENCY* | | | | | | | |
| 280.8 | 388.5 | 806.8 | 1637.8 | 3277.7 | 6621.1 | 13636 | 27980 | **CPU** | 2.792 | 2.673 | 2.626 | 2.891 | 2.885 | 2.777 | 2.823 | 2.811 |
| 4.008 | 5.348 | 8.028 | 13.438 | 22.877 | 41.899 | 76.869 | 147.31 | **GPU** | 0.740 | 0.633 | 0.644 | 0.648 | 0.638 | 0.640 | 0.637 | 0.641 |

*The runtime (in sec) analysis is performed on a system with Intel(R) Core i7-7700HQ CPU @2.80GHz, 16GB RAM, and with NVIDIA GTX 1070 GPU, using Python.

FIGURE 4

Pattern Detection

SC  Q

*size:* 19×31

Let us calculate how many
SC occurs in this text.

SCGKKSJRIRMCSSCLCSCSCÖ
LSCLOOSLMSCÖKSOIHHISCJ
SCKSCTIHRGBJSCKNDKNSCS

*size:* 232×434

Bilinear Interpolation

50×100        Q = 2

N = 256        100×200

| Image Compositing | | | | |
|---|---|---|---|---|
| | People | | Plane | |
| Method | RT (sec) | PSNR (dB) | RT (sec) | PSNR (dB) |
| SCRandom | 46.34 | 31.17 | 166.5 | 31.80 |
| CTRAND | 0.194 | 30.66 | 1.101 | 31.25 |
| SCSobol | 604.2 | 50.42 | 2662.2 | 52.88 |
| CT0 | 0.153 | 50.38 | 0.961 | 52.86 |
| CONVN | 0.072 | ref. | 0.618 | ref. |

FIGURE 7

| Pattern Detection* | | | | |
|---|---|---|---|---|
| N | CONVN | SCMax (sec) | CTMAX (sec) | Memory |
| 8 | 7.653 sec | 91.43 | 7.59 | × 5.075 |
| 16 | | 128.69 | 7.62 | × 9.819 |
| 32 | | 211.60 | 7.60 | × 19.305 |
| 64 | | 384.88 | 7.61 | × 38.277 |
| 128 | | 755.64 | 7.62 | × 76.223 |

*Accuracy: 100% Pattern hits are obtained in all tests.

FIGURE 8

| Bilinear Interpolation | | | |
|---|---|---|---|
| **Method** | **RT* (sec)** | **PSNR (dB)** | **Memory** |
| **SCRandom** | 8.186 | 30.496 | × 22.792 |
| **CTRAND** | 0.024 | 29.857 | |
| **SCSobol** | 9.325 | 45.778 | × 22.803 |
| **CT0** | 0.015 | 44.661 | |
| **SCLFSR** | 7.707 | 35.927 | × 22.779 |
| **CTLFSR** | 0.025 | 34.665 | |
| **CONVN** | 0.009 | ref. | |

*RT: RunTime. For memory monitoring, MATLAB *whos* command is utilized. Tests are performed on a computer with Intel(R) Core(TM) i7-7700HQ CPU @2.80GHz, 16GB RAM.

Algorithm-1: Dynamic Approach

```
Get initial binary seed;
Get X to be encoded in a bit-stream;
for i = 1:1:bitstream_length
    %Imitate Comparator Operation
    if X > BTD(seed)
        bitstream(i) = 1;
    else
        bitstream(i) = 0;
    Perform XOR operation(s) for taps;
    Feedback & shift binary seed;
end
```

included in run-time

*BTD()*
b2d()
bi2de()
bit2int()

FIGURE 12

Algorithm-2: Table-based Approach

```
Get initial binary seed;
for i = 1:1:bitstream_length
    LFSR_TABLE(i) = BTD(seed)
    Perform XOR operation(s) for taps;
    Feedback & shift binary seed;
end
for i = 1:1:bitstream_length
    %Imitate Comparator Operation
    if X > LFSR_TABLE(i)
        bitstream(i) = 1;
    else
        bitstream(i) = 0;
end
```

included in run-time

*BTD()*
b2d()
bi2de()
bit2int()

FIGURE 13

| SCRand | CTRAND | SCSobol | CT0 | SCLfsr | CTLFSR | CONVN |
|---|---|---|---|---|---|---|
| RT: 34.417 | RT: <u>0.074</u> | RT: 37.778 | RT: <u>0.045</u> | RT: 29.205 | RT: <u>0.141</u> | RT: 0.032 |
| PSNR: 30.450 | PSNR: 29.782 | PSNR: 41.533 | PSNR: 41.540 | PSNR: 33.165 | PSNR: 33.321 | PSNR: ref. |
| MEM: ×23.506 | | MEM: ×23.520 | | MEM: ×23.508 | | |

Tests are performed on a computer with Intel(R) Core(TM) i7-7700HQ CPU @2.80GHz, 16GB RAM, MATLAB 2017b. Results are based on the average of 1000 different rounds.

METHOD FOR STOCHASTIC COMPUTING IMAGE PROCESSING USING CORRELATION CONTROLLED CONTINGENCY TABLES

CROSS-REFERENCE TO RELATED APPLICATIONS

This application claims priority to U.S. Provisional Application No. 63/525,603 titled "Method for Agile Stochastic Computing Image Processing" filed on Jul. 7, 2023.

STATEMENT REGARDING FEDERALLY SPONSORED RESEARCH OR DEVELOPMENT

This application is sponsored in party by Grant No. 2019511 through the National Science Foundation.

REFERENCE TO A "SEQUENCE LISTING," A TABLE, OR A COMPUTER PROGRAM

Not applicable.

FIELD OF THE INVENTION

The field of the invention is stochastic computing systems, specifically the field of simulating stochastic computing circuits for image processing tasks.

BRIEF DESCRIPTION OF THE DRAWINGS

The drawings constitute a part of this specification and include exemplary embodiments of the invention disclosed herein, which may be embodied in various forms. It is to be understood that in some instances, various aspects of the invention may be shown exaggerated or enlarged to facilitate an understanding of the invention. Therefore, the drawings may not be to scale.

FIG. 4 provides table comparing bit-wise bit-stream processing and CT approach in different computing platforms, specifically a CPU and GPU. Here, the runtime (in seconds) analysis is performed on a system with an Intel® Core i7-7700HQ CPU at 2.80 GHz, 16 GB RAM, and with NVIDIA® GTX 1070 GPU, using Python.

FIG. 7 provides a table of the simulation results of the image compositing task using the disclosed CT-based method.

FIG. 8 provides a table of the simulation results of the pattern detection task using the disclosed CT-based method.

FIG. 12 provides an algorithm for a dynamic approach of the linear feedback shift register (LSFR)-based approach.

FIG. 13 provides an algorithm for a table-based approach of the LSFR-based approach.

BACKGROUND OF THE INVENTION

Figure 1A:
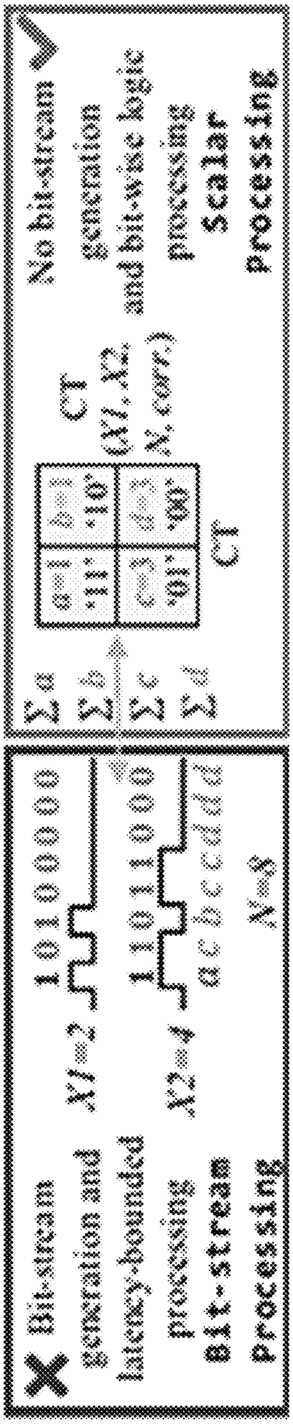
FIG. 1A provides a summary of contingency table (CT) and bit-by-bit simulation from bit-streams to scalar-only processing.

Stochastic computing is re-emerging as an alternative method of computing, replacing conventional binary computing. Stochastic computing offers hardware-friendly solutions for various applications, from vision to learning machines. Low-implementation cost and high tolerance to noise are the main advantages of computation in the stochastic domain. Arithmetic operations are performed by simple bit-wise operations on uniform (random) bit-streams. For example, multiplication is realized by bit-wise AND operation on the bit-streams. Both approximate and accurate computations are feasible with stochastic computing by structuring bit-streams and controlling their length. More than 50× to 100× reduction in the hardware cost is common compared to the cost of binary counterparts. Tolerating high rates of noise (e.g., 30%-50%) is another appealing property, as all digits of a stochastic computing bit-stream have the same weight.

Stochastic computing has been popular for simple execution of complex image processing tasks. Considering the large number of image data that need to be processed, fast simulation of these stochastic computing-based systems is challenging even with short bit-stream sizes of 100 bits. Sometimes large design space explorations are done by varying the bit-stream size from hundreds to tens of thousands of bits to study the performance of an stochastic computing system.

Unipolar encoding (UPE) and bipolar encoding (BPE) are the two most common methods for encoding data in stochastic computing. Both UPE and BPE can encode a positive scalar value X where 0≤X≤N (or a probability value $$\frac{X}{N}$$

where $$0 \le \frac{X}{N} \le N.$$

However, DIE supports negative values −N≤0≤N (or $$-1 \le \frac{X}{N} \le 1$$

). The trade-off is that BPE needs twice bit-stream length for the same accuracy. The number of logic-1s in a bit-stream determines the bit-stream value. Assume that X represents an encoded bit-stream and the $i^{th}$ bit is accessed by X (i). In UPE, the total number of logic-1s, $$\Sigma_{i=1}^{N} X(i),$$

divided by N determines the bit-stream value, so $$P = \frac{\sum_{i=1}^{N} X(i)}{N}.$$

On the other hand, in BPE, the bit-stream value is determined by $$P = \frac{\sum_{i=1}^{N} X(i)}{N} = \left(\frac{X}{N} + 1\right) \Big/ 2.$$

An important step in designing stochastic computing systems is evaluating their performance and verifying their functionality by simulating their bit-level operations with software programs. In stochastic computing, the accuracy of computations increases by increasing the bit-stream length. To represent a data value with a binary resolution $$\frac{1}{2^n},$$

a bit-stream with a length of at least $N=2^n$ bits is needed. This means that the length of a stochastic bit-stream increases exponentially with the resolution. Depending on the needed accuracy, stochastic computing systems process bit-streams with different lengths, from short lengths of $2^3$ to longer lengths of $10^3$-$10^4$ bits. Computer simulation of stochastic computing systems with long bit-streams often takes a long latency and a high amount of memory. Even for simulation of basic stochastic computing operations such as multiplication of two data by bit-wise ANDing two operand bit-streams, long latency is inevitable when very long bit-streams are processed. This means that the simulation of stochastic computing systems also faces time and memory complexity challenges due to conducting very long bit-by-bit processing. Especially, simulating stochastic computing-based processing of high-density data like image matrices in row-column format is very time-consuming.

The power of stochastic computing stems from the probabilistic behavior of random bit-streams in which 1s and 0s occur randomly in no specific order. The current distributions for stochastic bit-streams in the art are: Binomial distribution, Sobol-based low discrepancy (LD), and linear feedback shift register (LSFR)-based pseudo-random. During bit-stream generation, a stochastic bit-stream generator is coupled with a comparator that compares a randomly generated binary number with the to-be-encoded input scalar value. If the scalar value is greater than the random number, the corresponding bit of the bit-stream is 1; otherwise, it is 0. LFSR-based randomization is the most popular bit-stream generation method in the literature. LSFR provides pseudo-randomness with binary numbers that are generated circularly. Some recent works use Sobol sequences to generate quasi-random numbers. Sobol sequences are used to generate LD bit-streams for highly accurate stochastic computing arithmetic. The third approach uses binomial distribution and has been used in the literature in quantifying random fluctuation error of stochastic computing operations. The probability P, represented by a stochastic bit-stream, can be considered based on a set of samples from a random variable (RV) having a Bernoulli distribution with a success probability of P. Bernoulli distribution is employed to produce bit-streams with uniformly distributed bits. The distribution is obtained by using N different Bernoulli trials.

Correlation between stochastic bit-streams is an important concept in stochastic computing. Some operations, such as multiplication using logical AND, require uncorrelated or independent operand bit-streams for accurate operation. Some other operations, such as absolute value subtraction using XOR, minimum using AND, and maximum using OR, require maximally correlated operands for correct performance. Stochastic cross-correlation (SCC) has been used in the art to quantify correlation between two bit-streams. The piecewise function shown in Equation 1 below returns a correlation value within the [−1,1] interval. In the formula, the values denoted by a, b, c, and d are logic pairs 11, 10, 01, and 00, respectfully, from the same bit position of two bit-streams.

$$SCC = \begin{cases} \dfrac{ad - bc}{N \times \min(a+b, a+c) - (a+b) \times (a+c)}, & \text{if } ad > bc \\ \dfrac{ad - bc}{(a+b) \times (a+c) - N \times \max(a-d, 0)}, & \text{else} \end{cases} \quad (1)$$

Contingency tables have been suggested in the art as an option for run-time-efficient and memory aware simulation of stochastic computing systems. Instead of generating and processing actual stochastic bit-streams, CTs can calculate the desired logic operation of over the scalar input operands that make up the bit-streams. For any two operands (bit-streams), a CT is built.

Figures 9, 10A:
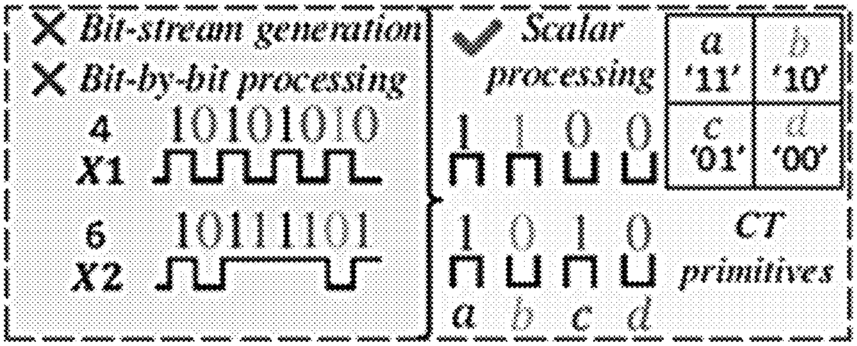
FIG. 9 provides a table of the simulation results of the bilinear interpolation task using the disclosed CT-based method.
FIG. 10A compares traditional bit-stream processing and CT-based approaches.

Correlation is the key parameter during the setup of a CT. CT is a 2×2 table with four basic primitives: a, b, c, and d. As if i-bit bit-streams are generated, the binary interaction between input operands (i.e., bit-streams) are recorded for 11, 10, 01, and 00 logic pair overlaps in any i position of the bit-streams. FIG. 2A shows an example of generating a CT. Logic pairs at any bit position i are cumulatively denoted using the CT primitives a, b, c, and d. Logic operations are defined using these primitives. For example, AND operation corresponds to 11 (i.e., a) bit pairs between the two bit-streams, X1 and X2. Without explicitly generating bit-streams, the CT is directly generated from the scalar (binary equivalent) values of X1 and X2, where 0<X1, X2<N, and N is the bit-stream length. Now the question is how to find a, b, c, and d values directly from scalar values. The answer depends on "correlation". For correct functionality, some SC designs need input bit-streams with maximum correlation. Some others need inputs with minimum correlation, and some need uncorrelated inputs. Stated another way, each primitive holds the cumulative sum of the four possible states from all corresponding bit positions in two bit-streams (a: X1 (i)=1, X2 (i)=1→'11', b: X1 (i)=1, X2 (i)=0→'10', c: X1 (i)=0, X2 (i)=1→'01', and d: X1 (i)=0, X2 (i)=0→'00'). FIG. 10A compares traditional bit-stream processing and CT approaches. The CT, when acting as a bit-stream emulation construct, processes scalar values directly rather than converting them to bit-stream format; thereby: (i) there is no bit-stream generation, and (ii) latency-prone bit-by-bit processing is avoided.

Figure 10B:
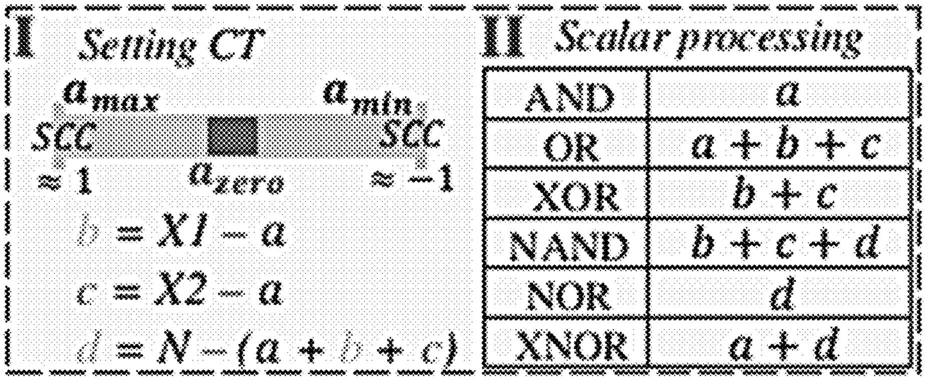
FIG. 10B provides how a CT is set and logic operations with scalars.

FIG. 10B may also show how a CT is set. The inputs are: 1) N, 2) the input scalars (X1, X2), and 3) the target correlation. a is the first CT primitive we find. It is called the prior primitive. Since a represents the number of overlapping Is between two bit-streams, it denotes the number of Is that occur at the output of logical AND operation. The determination of a is an antecedent for other primitives and depend on the correlation. According to the SCC metric, the three critical points in the correlation spectrum between −1 and 1 can be expressed with $a_{max}$, $a_{min}$, and $a_{zero}$. Respectfully, these are the maximum correlation where SCC converges to +1, minimum correlation where SCC converges to −1, and near-zero correlation where SCC is around zero. The near-zero correlation is particularly critical for operations such as multiplication (AND in UPE, XNOR in BPE) where uncorrelated bit-streams are needed. As shown in FIG. 10B, the three critical correlation points, $a_{max}$, $a_{zero}$, and $a_{min}$, are determined during CT setup and initiate the corresponding CTMAX, CT0, and CTMIN tables, respectively. The maximum value of a, $a_{max}$, is determined by min(X1, X2). The minimum value of a, $a_{min}$, is determined by max(0, X1+X2−N). CT0 is obtained by optimizing the SCC formula to zero, which yields $$a_{zero} = \left\lfloor \frac{X1 \times X2}{N} \right\rceil.$$

After finding the prior primitive, the other primitives (b, c, and d) are determined by the formulas shown in FIG. 10B. For example, b is found by X1−a. When CT is set, only the CT primitives and their linear combinations with summation are sufficient to obtain the output of logical operations. The scalar processing table in FIG. 10B can be used to find the total count of 1s in the output of the primary logic operations.

Figure 1B:
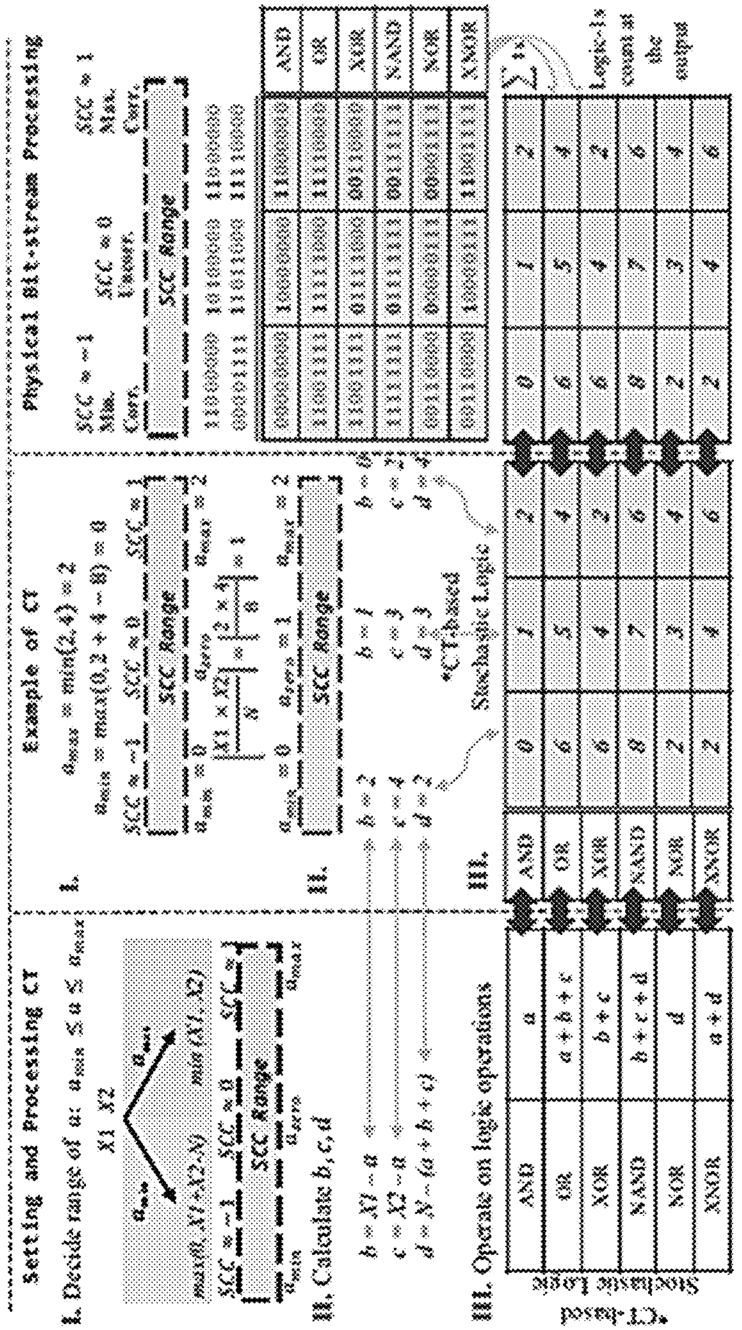
FIG. 1B provides the steps for setting up CT in different applications. In the left sections are the steps for setting up the CT and provides the relation between CT primitives (a, b, c, d) and logic operations. The middle section provides a numerical example of setting up CT with X1=2, X2=4 from bit-streams to scalar-only processing. The right section provides the same example as shown in the center using actual bitstreams.

FIG. 1A also shows an example of generating a CT using this process. The formulas discussed above are presented in FIG. 1 (*b*)-I, (*b*)-II, and (*b*)-III in the left section. FIG. 1B, center section, provides an example of setting up CT for X1=2 and X2=4. Steps I, II, and III of FIG. 1B, center section, depict the CT formation for three correlation points: minimum, zero, and maximum. The numeric table in step III shows the number of Is in the output bit-stream resulting from different logic operations. FIG. 1B, right section, shows example bit-streams for X1 and X2 scalars for different correlation points and the corresponding logic results using traditional bit-by-bit processing. As it can be seen, the logic results shown in FIG. 1B center and right section are the same.

SUMMARY OF THE INVENTION

The disclosed method presents an efficient method for simulating stochastic computing circuits, along with innovative implementations for image processing tasks. By using a single 2-to-1 multiplexer (MUX), this method may perform image compositing by combining foreground and background images into a single image. For bilinear interpolation, which resizes images, the disclosed method may use a 4-to-1 MUX, which may simplify complex multiplication and addition operations into simple logic gate-level operations. The disclosed method may also utilize an XOR gate for template matching, which looks up a template image in a larger reference image by processing the stochastic bit-stream representation of image pixel values. To evaluate the method, both actual bit-stream implementation and an efficient contingency table (CT)-based simulation are utilized and compared. The disclosed method further may emulate different random sources, such as the binomial distribution, Sobol low discrepancy sequences, and linear-feedback shift register (LFSR) using contingency tables. Our evaluations on sample images show that the execution time for the image compositing task is reduced by over 200 times when emulating bit-streams, while pattern detection and bilinear interpolation show memory usage reductions of 76 and 22 times, respectively.

Considering the large number of image data that needs to be processed in complex image processing tasks, the disclosed method herein performs stochastic computing in a radically different way than methods currently known in the art. Arithmetic operations on scalar values replace traditional bitwise operations on stochastic bit-streams. The input operands are processed with the aid of a contingency table (CT) construct without explicitly processing bit-streams. This allows latency-free and memory-aware emulation of stochastic computing systems without impacting the results and with similar accuracy as traditional methods. The developments provided by the disclosed methods comprise proposing CT-based methodology for simulating random sources of stochastic computing and stochastic computing designs for image processing tasks, namely template matching, image compositing, pattern detection, and bilinear interpolation.

DETAILED DESCRIPTION OF THE INVENTION

Figure 2:
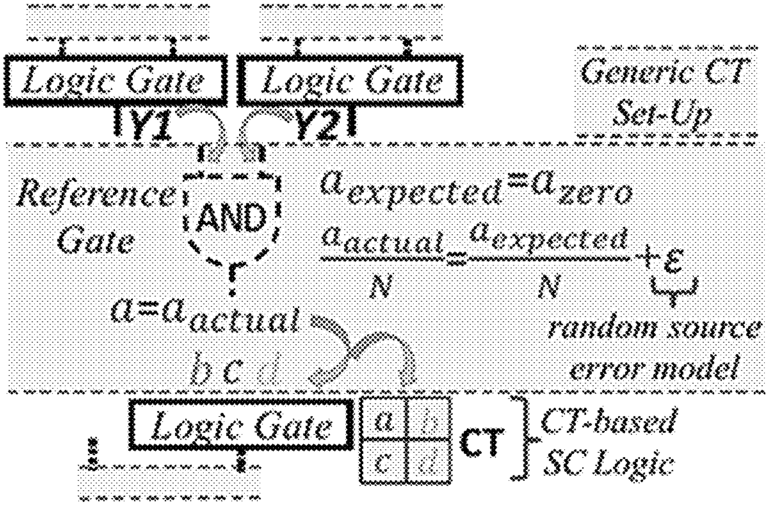
FIG. 2 provides a generic CT set-up wherein the encapsulated CT setting followed from the circuits' inputs to the output.

First defined is a method for contingency table set-up for simulating multi-level cascaded stochastic computing circuits, which may be as shown in FIG. 2. FIG. 2 depicts the encapsulated CT setting followed from the stochastic computing circuits' inputs to the output. Considering Y1 and Y2 inputs connected to any gate type at the mid-level, the AND reference gate is temporarily evaluated using near-zero correlation, $a_{zero}$. First, the reference AND gate's a CT primitive (i.e., expected value) is generated. Next, the actual value is estimated, wherein the actual value may be equal to the expected value plus e, wherein e comprises a random source error model. Last, other CT primitives are calculated based on actual a. In an embodiment involving complex circuits with reconvergent paths (especially when processing lower bit-streams, e.g., 512,1024), the designer may benefit from the reconvergence involve correlation. At the output of the reconvergent paths, signal correlation can be used to define the expected value via $a_{min}$ or $a_{max}$. The reconvergence awareness in CT simulations may be beneficial to reduce error especially for complex circuits (levels>3) when processing long bit-streams. Nevertheless, in the preferred embodiment, the expected value assignment demonstrated in FIG. 2 for the image processing circuits (those having $\epsilon \neq 0$).

Now disclosed are novel image processing applications for CT-based stochastic computing: template matching, image compositing, bilinear interpolation, and pattern detection.

Template Matching. In template matching, a template K is searched throughout an image I, using a sliding window. In this process we let $I_{(r \times c)}$ be a grayscale image with r×c size. The template, as a kernel $K_{(r_K \times c_K)}$, is a subset of/like a 1-Dimensional (1D) or 2D window, where $r_K<r$ and $c_K<c$. K is applied on/by processing each intersecting pixel of I and K. The movement of K is similar to the convolution operation. The main objective of template matching is to catch the highest similarity and get the exact template match. The conventional operation is defined using $T=\Sigma f(I, K)$, where $f(I, K)$ can be any of the following: (i) $f=|I-K|$, (ii) $f=(I-K)^2$, or (iii) $f=I \times K$. The first function is an absolute difference operation and the temporary matching image T is set as the sum of the absolute differences (SAD). The second function is an MSE-related formula based on the sum of the squared differences (SSD), and the third one is a cross-correlation-based function. Depending on the selected method, T is processed to find its minimum-valued (if (i) or (ii) is utilized) or maximum-valued (if (iii) is applied) positions that indicate the template coordinates. In (iii), the correlation function is similar to convolution without spatially flipping the template. Nevertheless, brighter pixel may cause a wrong template assignment. "Normalization" is proposed as a solution for this issue. If pixel operations are kept in the interval, the brighter pixel values may be assigned as the template, and normalized range is recommended. At this point, stochastic computing can be used by processing data in the [0,1] interval. This cross-correlation-based approach (iii) fits stochastic computing using the AND multiplier. Bested, in stochastic computing-based template matching with (iii), performing AND operation on probabilities brings normalization. A state of the art performs normalization by dividing $\Sigma f(I \times K)$ by the product of the main image and the template $L_2$ norms, $|I|_2 \times |K|_2$. This term is approximated as N×N coming from the denominator of $P_I \times P_K$, when stochastic computing-based AND is applied.

Figure 11A:
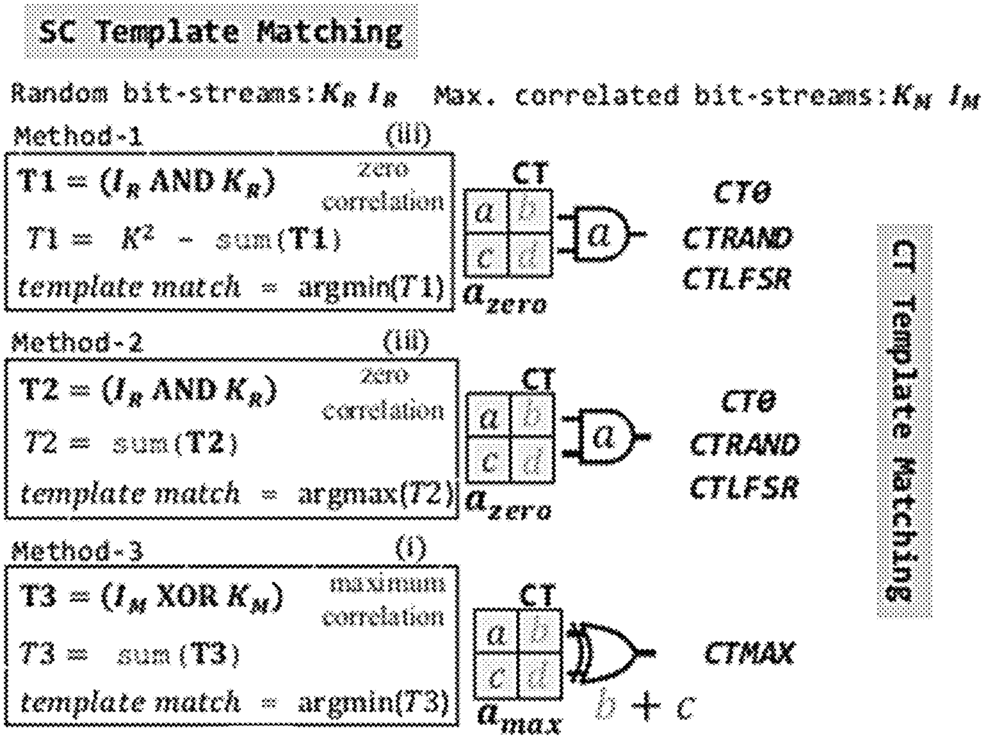
FIG. 11A shows the logic diagrams for the stochastic computing image processing methods, namely three methods for template matching and the corresponding CT simulations.

FIG. 11A depicts an embodiment of the stochastic computing-based template matching method. Method-1 and Method-2 use the multiplication property of (iii) via AND operation, while Method-3 uses the absolute value subtraction of (i) with bit-wise XOR. In Method-1, bit-streams from I (I) and bit-streams from K (K) are represented in UPE and must have zero correlation for accurate multiplication. After bit-wise ANDing I and K, T1 is decoded using a simple sum, i.e., the population counts of 1s. The result is expected to be $\Sigma f(I \times K)$. Method-1 subtracts $\Sigma f(I \times K)$ from $K^2$, which produces a zero for an exact template match. Method-2 includes only an stochastic computing multiplication. It approximately targets the maximum values, i.e., $K^2$ on the exact matches and so is less accurate than Method-1. Finally, Method-3 uses the absolute value subtraction of (i) by performing bit-wise XOR on maximally correlated bit-streams. The method finds an exact match when decoding T3 produces a zero. Therefore, minimum valued positions represent the template coordinates. We note that, in each method, only the bold parts are processed in the stochastic domain. Thus, Method-2 and Method-3 have only stochastic computing operations, while Method-1 also includes binary subtraction and square operation in the conventional binary domain. For the CT approach, Method-1 and Method-2 are performed with uncorrelated CT models targeting zero correlation and random source simulation, as presented in FIG. 11A on the right side of the figure. The binomial distribution using CT by CTRAND and the LFSR model with CT by CTLFSR. The Sobol-based model is also given by CT0, which is the most accurate case. Method-3 requires maximum correlation, and so uses CTMAX.

Figure 3A:
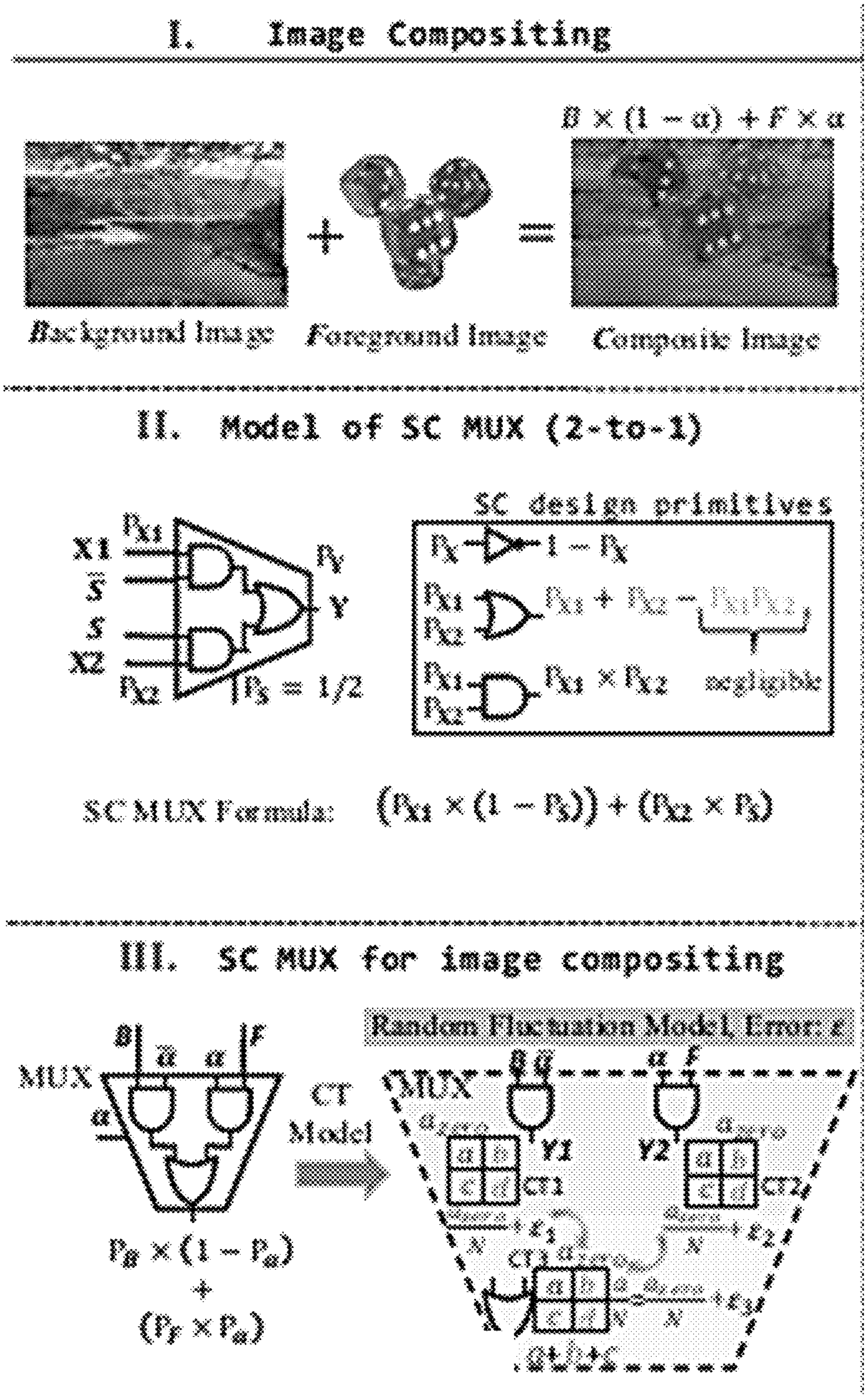
FIG. 3A provides a method for CT-based image compositing.
Figure 3B:
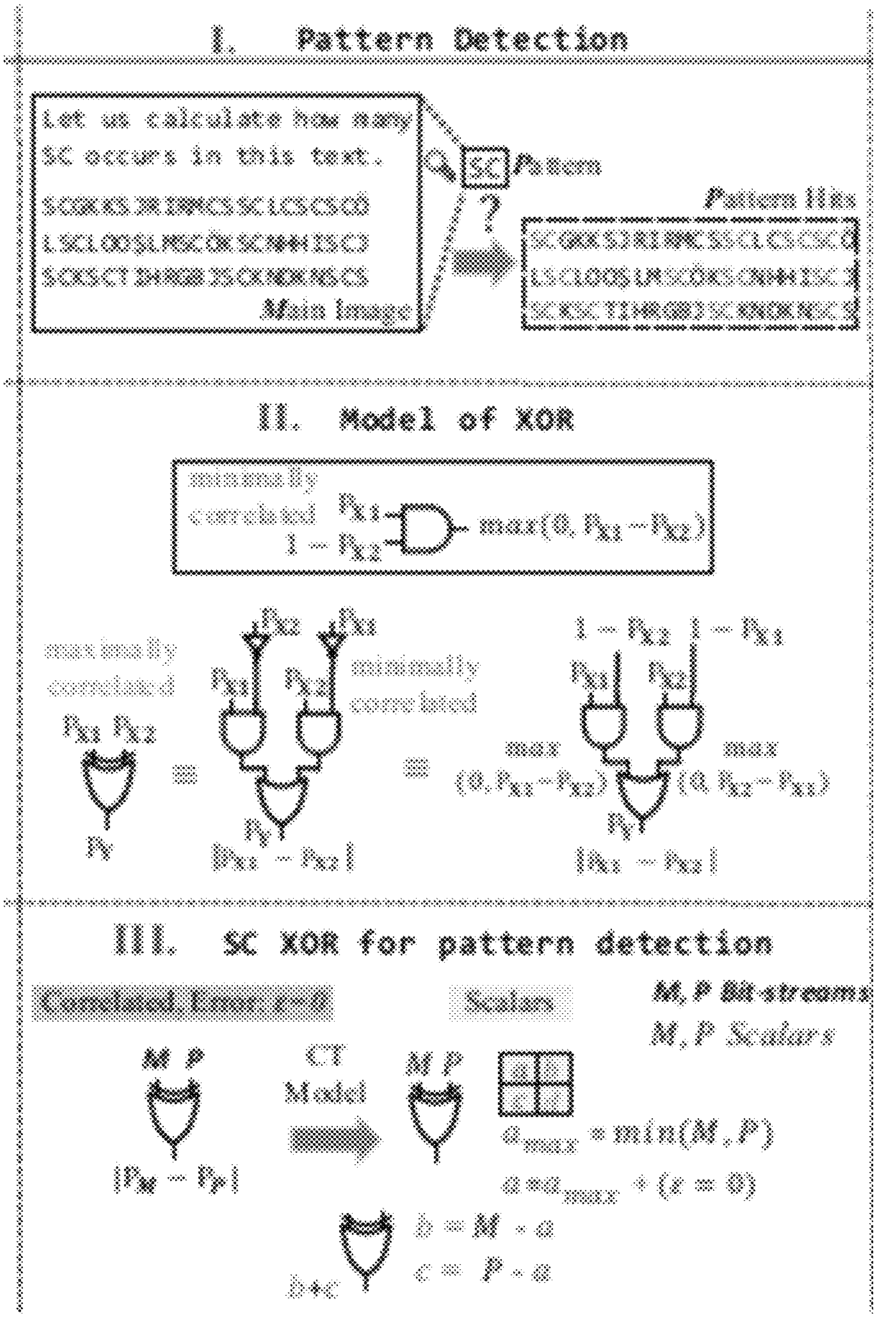
FIG. 3B provides a method for CT-based pattern detection.
Figure 3C:
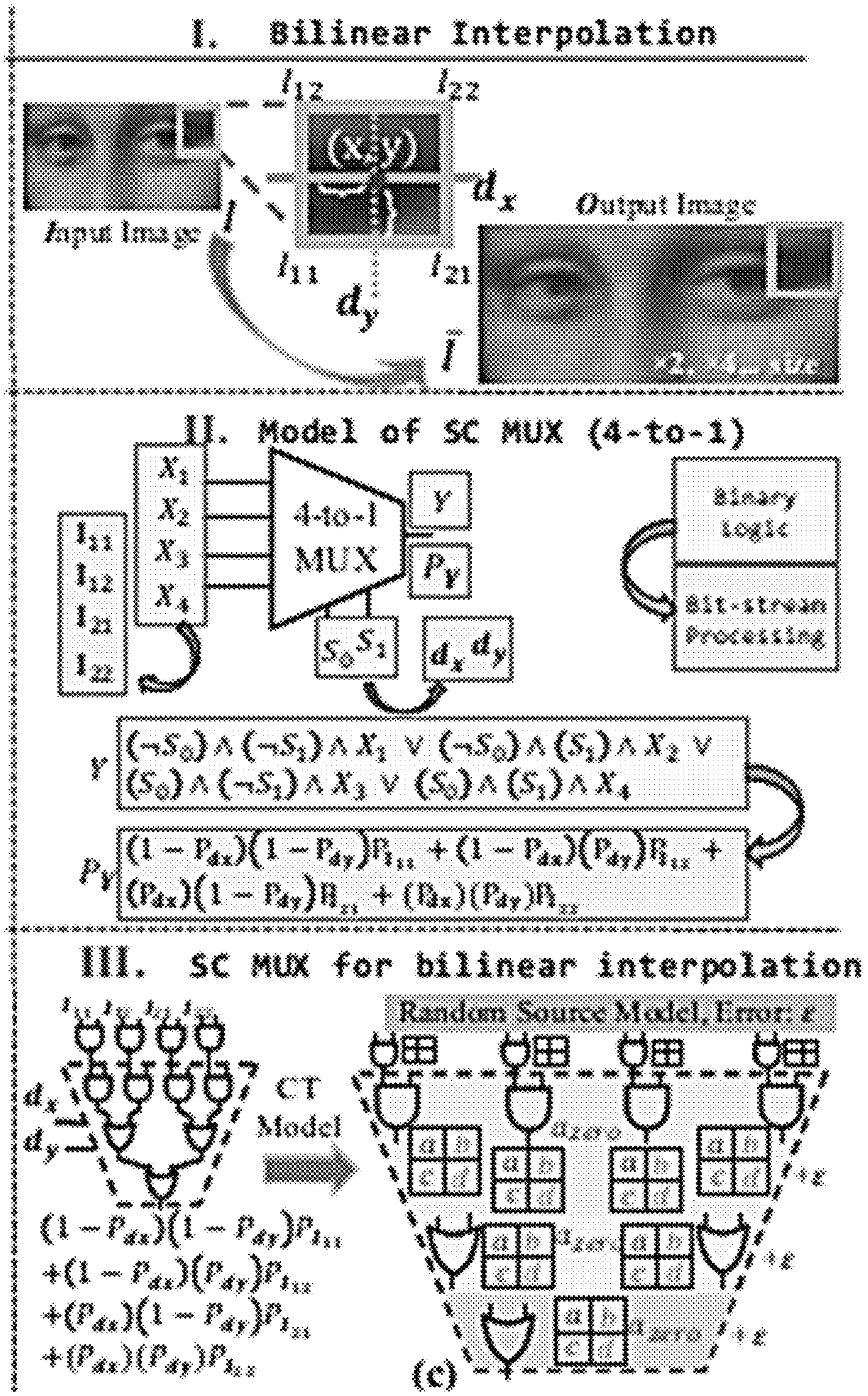
FIG. 3C provides a method for CT-based bilinear interpolation.
Figure 5A:
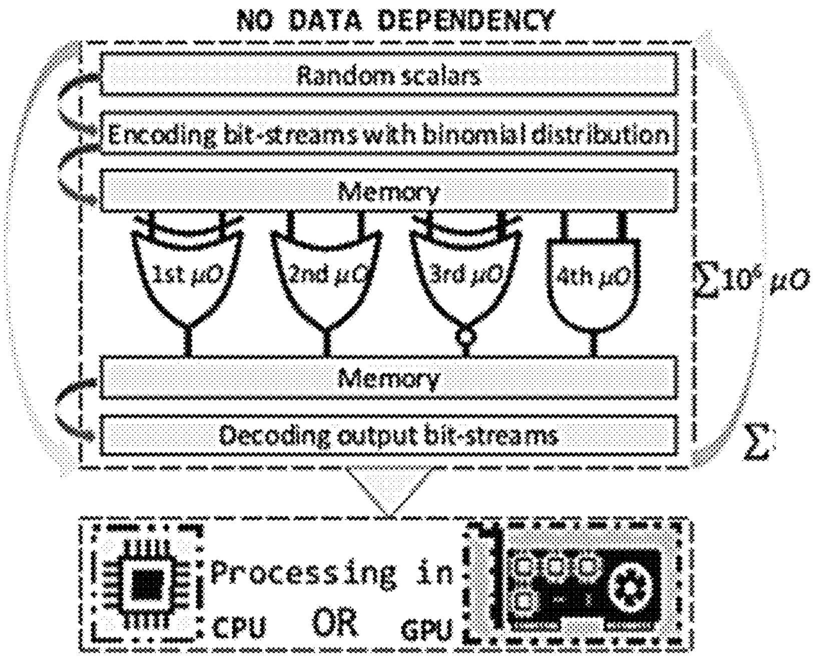
FIG. 5A provides a test procedure for simulating stochastic computing operations with no data dependency.
Figure 5B:
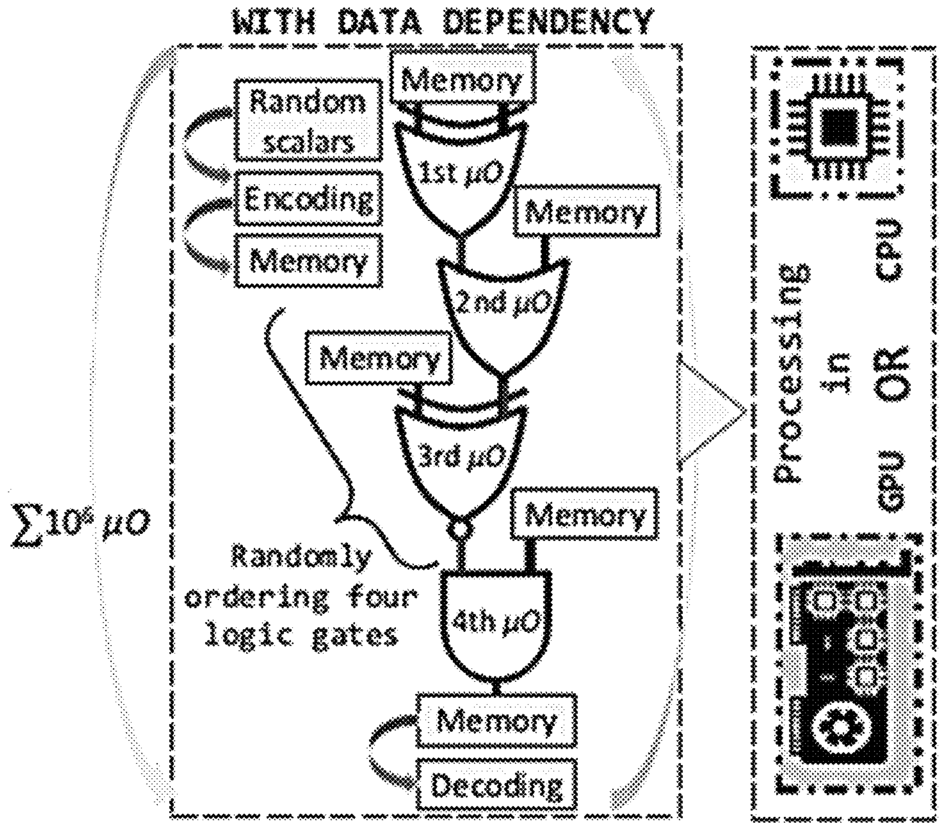
FIG. 5B provides a test procedure for simulating stochastic computing operations with data dependency.
Figure 6A:
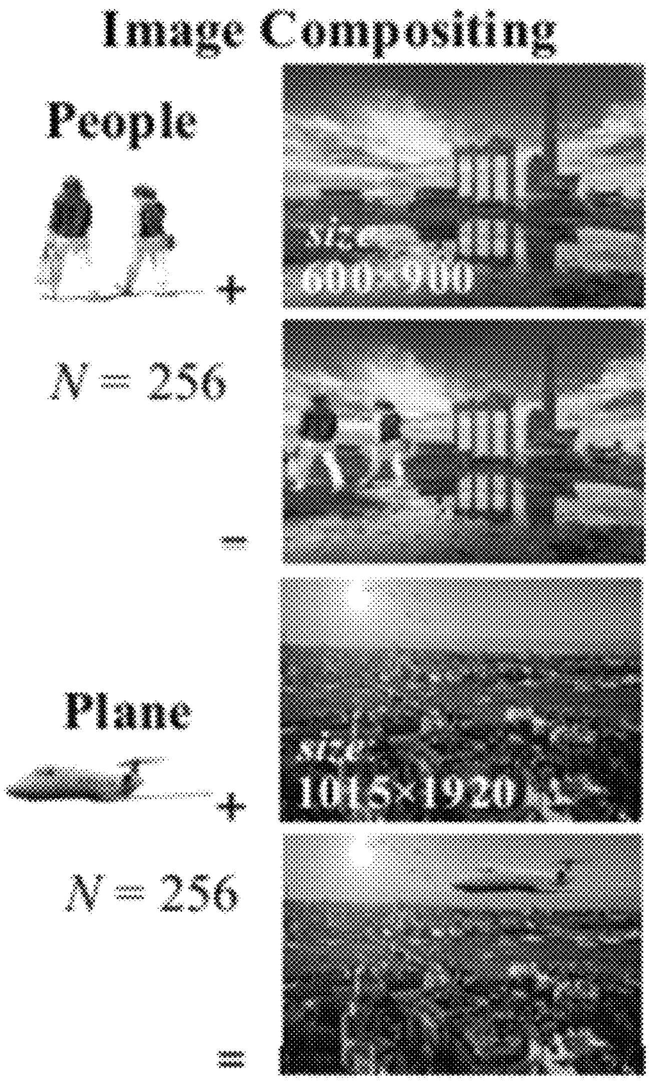
FIG. 6A provides the details of the image compositing tasks for test and sample inputs.
Figure 6B:
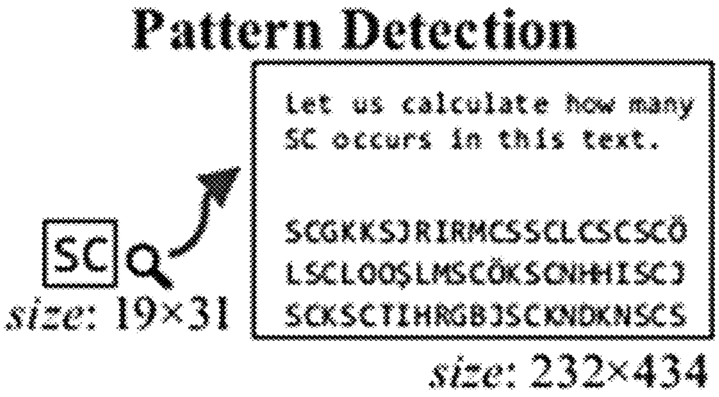
FIG. 6B provides the details of the pattern detection tasks for test and sample inputs.
Figure 6C:
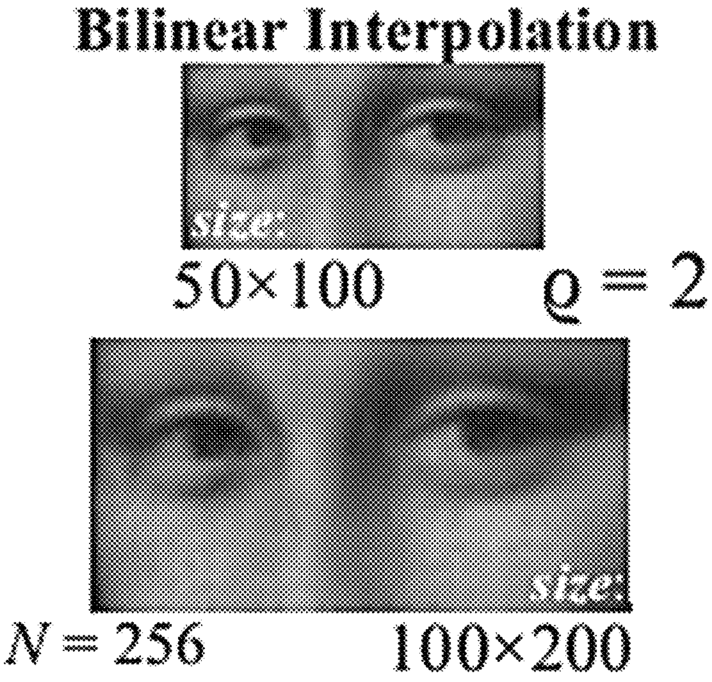
FIG. 6C provides the details of bilinear interpolation tasks under test and sample inputs.
Figure 11B:
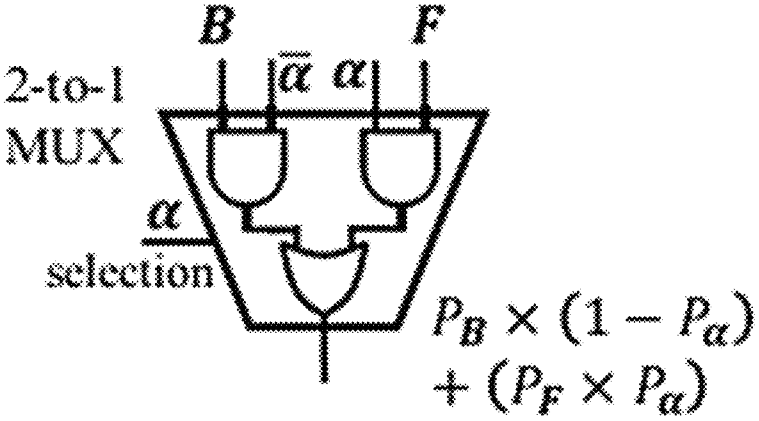
FIG. 11B shows the logic diagrams for image compositing methods using a 2-to-1 multiplexer.
Figure 11C:
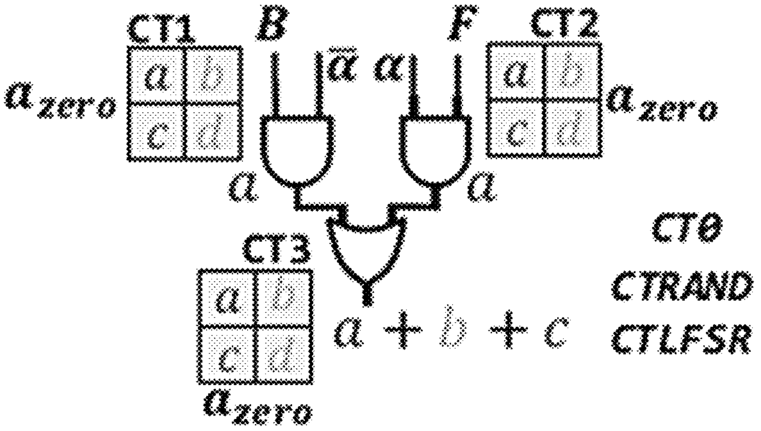
FIG. 11C shows the logic diagram of the cascaded CT mode of the multiplexer shown in FIG. 11C.

Image Compositing. FIG. 3(*a*)-I shows an example of image compositing operation. For image compositing operation, a 2-input multiplexer (MUX) combines two images: background B and foreground F. In conventional image processing, a composited image (C) is denoted by the formula $C=B(1-\alpha)+F\alpha$, where $\alpha$ is the foreground image opacity. A MUX with X1 and X2 input and S select bit-stream implements $P_{X1}(1-P_S)+P_{X2}P_S$ where $P_S$ is the probability of the select input. The stochastic computing MUX formula is further detailed in FIG. 3(*a*)-II. The composited image C and the MUX formula are well-matched by re-writing $C=P_B(1-P_\alpha)+P_F P_\alpha$. FIG. 11C illustrates an embodiment of the CT model for a MUX. FIG. 3(*a*)-III provides the tables that renders the CT model for a MUX (built from two AND and one OR gates). As shown in FIG. 11B, connecting B, F, and $\alpha$ to a MUX may yield the compositing operation. Multiple CTs are constructed with near-zero correlation initially. Since the AND operation result is the same as the "a" primitive, CT1 may be set by considering near-zero a ($a_{zero}$):

$$CT1_{a_{zero}} = \left\lfloor \frac{B \times (N-\alpha)}{N} \right\rceil.$$

Likewise, CT2 is set by $$CT2_{a_{zero}} = \left\lfloor \frac{F \times \alpha}{N} \right\rceil.$$

After calculating a zero-correlated a value, the random fluctuation error ($\epsilon$) from the input bit-stream generators can also be taken into account by carrying out the steps of the CT set-up shown in FIG. 2. Next considered are binomial distribution, LSDR and Sobol bit-stream generation models to continue the calculation.

Binomial Distribution. Bit-streams have binomial distribution when each bit is a Bernoulli random variable (RV).

Considering the Independent and Identically Distributed RV, a stochastic bit-stream has a binomial distribution with a variance $$\sigma^2 = \frac{P(1-P)}{N},$$

where P is the success probability of the Bernoulli distribution. The expected result from the stochastic computing operations is called the exact value or $P_Y$. However, the produced value at the output of the stochastic computing operation can differ from the expected value due to random fluctuations. The produced value is called the estimated value or $\acute{P}_Y$. The difference between the exact and estimated values is evaluated with the mean squared error (MSE). The random fluctuations errors may be measured using $\text{MSE}<\text{error}=\mathbb{E}[(P_Y-\acute{P}_Y)^2]$, which yields $\text{error}=P_Y(1-P_Y)/N$ in Bernoulli RV case. From the squared error to the square-rooted format, the error is $\epsilon=\sqrt{\text{err}_Y}$. The random fluctuations error is defined such that the error decreases as N increases. MSE results in the variance $\sigma^2$, with regards to output probability. Hence, the CT simulation approach can directly take $\sigma=\sqrt{P_Y(1-P_Y)/N}$ into account.

LFSR. LFSRs may be modeled in a CT approach (CTLFSR) using a hypergeometric distribution. The distribution shows that LFSR-based bit-streams fit better to hypergeometric RV bit-stream generation than the binomial distribution. The output deviation of the bit-wise AND operation on LFSR based bit-streams may be defined as $$\sigma = \sqrt{\frac{P_{X1}\times P_{X2}\times(1-P_{X1})\times(1-P_{X2})}{N-1}}.$$

Since AND output is related to the "a" primitive, this output deviation can be used after setting up the CT via "a". For the near-zero CT (CT0), a must be updated. So, the output probability model for bit-wise ANDing LFSR-based bit-streams may become $$\frac{a}{N} + \sqrt{\frac{P_{X1}\times P_{X2}\times(1-P_{X1})\times(1-P_{X2})}{N-1}}.$$

Sobol. Sobol-based bit-streams achieve deterministic-like arithmetic accuracy if long enough bit-streams are processed. For example, accurate result from multiplying two n-bit precision data can be achieved by processing N×N-bit Sobol bit-streams where $N=2^n$. Since a=

$$\left\lfloor \frac{X1\times X2}{N} \right\rceil$$

is obtained from SCC=0 optimization that guarantees high accuracy in AND multiplication, Sobol-based and CT0-based results are expected to be similar.

FIG. 3(*a*)-III has AND gates in the first level of MUX. After obtaining $a_{zero}$, the obtained output probabilities of CT1 and CT2, $$\frac{a}{N},$$

are determined via $$\frac{a}{N} \pm \epsilon.$$

In FIG. 3(*a*)-III, after including the relevant error in CT1 and CT2, a new CT is set for the next logic operation, which is an OR operation. Similar to the first level of the circuit, the generic CT set-up is followed for this level of logic. The expected output probability and input probabilities are important for calculating $\epsilon$ in the binomial and LFSR-based random source error, respectively. The AND gate model as a reference is initially calculated for the random source error; thereby, the CT prior primitive a is first fine-tuned. Returning to FIG. 3(*a*)-III, for modeling MUX, CT3's near-zero correlated output probability, $$\frac{a_{zero}}{N},$$

is updated with $\epsilon$. After updating the prior primitive, the other primitives (b, c, and d) are calculated for the final OR logic operation.

Bilinear Interpolation. A further stochastic computing design method disclosed is bilinear interpolation used in image resizing. Bilinear interpolation is based on linear interpolations in both x (width) and y (height) directions of the xy plane. With repetitive linear interpolations for x and y, bilinear interpolation (a.k.a. bilinear filtering) is obtained. Let I be a 2D matrix with x and y row-column structure. Four points in the coordinate system define the I rectangular region: $(x_1, y_1)$, $(x_1, y_2)$, $(x_2, y_1)$, and $(x_2, y_2)$. A new point lying inside this region is denoted as (x, y). Based on the vertices of I, I (x, y) is to be estimated. After x- and y-related interpolations, the formula for bilinear interpolation is denoted as:

$$I(x, y) \approx a_{11}I(x_1, y_1) + a_{21}I(x_2, y_1) + a_{12}I(x_1, y_2) + a_{22}I(x_2, y_2)$$

where $$a_{11} = [(x_2-x)(y_2-y)]/[(x_2-x_1)(y_2-y_1)]$$
$$a_{21} = [(x-x_1)(y_2-y)]/[(x_2-x_1)(y_2-y_1)]$$
$$a_{12} = [(x_2-x)(y-y_1)]/[(x_2-x_1)(y_2-y_1)]$$
$$a_{22} = [(x-x_1)(y-y_1)]/[(x_2-x_1)(y_2-y_1)]$$

By mapping I into the unit square via normalization of the values, the vertices are now $(x_1=0, y_1=0)$, $(x_2=1, y_1=0)$, $(x_1=0, y_2=1)$, and $(x_2=1, y_2=1)$. Thereby, $$I(x, y) \approx (1-x)(1-y)I(x_1, y_1) + (x)(1-y)I(x_2, y_1) + (1-x)(y)I(x_1, y_2) + (x)(y)I(x_2, y_2)$$

$I_{(r\times c)}$ represents an image with r rows and c columns, and the resized image, $\bar{I}_{(\varrho r\times \varrho c)}$, is obtained by bilinear filtering. Rewriting the equity for I(x, y) results in $(1-dx)(1-dy)I_{11}+$ $(1-dx)(dy)I_{12}+(dx)(1-dy)I_{21}+(dx)(dy)I_{22}$ where $I_{11}$, $I_{12}$, $I_{21}$, $I_{22}$ are neighboring pixel values, and dx, dy are relative positions.

For stochastic computing design, the probabilities of the neighboring pixels and relative positions are denoted as $P_{I_{11}}$, $P_{I_{12}}$, $P_{I_{21}}$, $P_{I_{22}}$, $P_{dx}$, and $P_{dy}$. By using the equation of I(x, y), the following is obtained:

$$P_{I(x,y)} = (1-P_{dx})(1-P_{dy})P_{I_{11}} + (1-P_{dx})(P_{dy})P_{I_{12}} + (P_{dx})(1-P_{dy})P_{I_{21}} + (P_{dx})(P_{dy})P_{I_{22}}$$

Figure 11D:
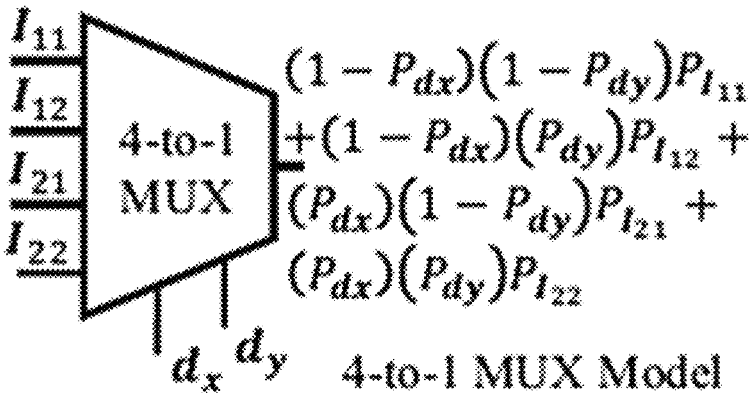
FIG. 11D shows the logic diagram of bilinear interpolation with a 4-to-1 multiplexer.
Figure 11E:
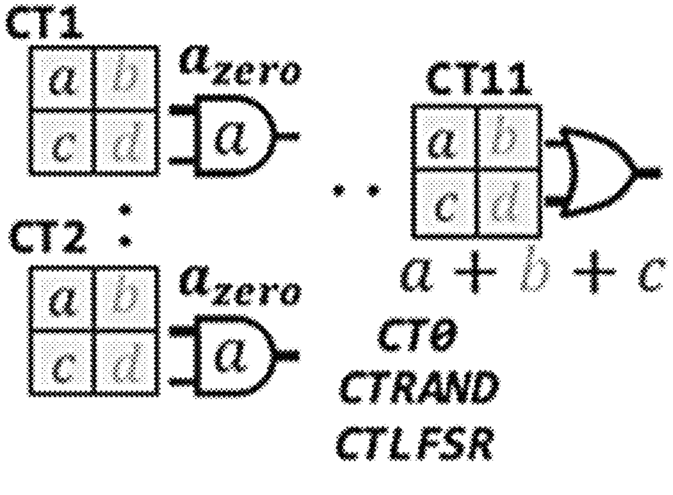
FIG. 11E shows the corresponding multi-level CT model for the method shown in FIG. 11E using AND and OR gates.

As shown in FIG. 11D, this may be be implemented with a 4-to-1 MUX, where dx and dy are connected to the select ports of the MUX. FIG. 11E shows the CTs for modeling this MUX. Another example can be seen in FIG. 3C.

Pattern Detection. Pattern detection is shown in FIG. 3(*b*)-I. This task is based on maximum correlation. The two inputs from the main image and the pattern image may be maximally correlated to utilize XOR gate as a stochastic computing subtractor. FIG. 3(*b*)-II elaborates on the formula and functionality of the XOR gate as a stochastic computing primitive. As shown, when input bit-streams are positively correlated (i.e., have maximum overlap between the positions of 1s) bit-wise XOR acts as an absolute subtractor, $|P_{X1}-P_{X2}|$. This can be used for pattern search in an image, where X1 relates to the main image (M), and X2 holds the pattern (P) to be searched in X1. The difference gives zero value for the exact pattern match. The CT for the pattern detection task is shown in FIG. 3(*b*)-III. The model of positively correlated input operands is established in CT using $a_{max}$. For this process, the generic CT setting assigns max to the expected value, which is also equal to the actual value since $\epsilon=0$. First $a_{max}$ is found using min(X1,X2) formula, and the b and c primitives are calculated. The XOR result is obtained from CT via b+c, without explicit bit-stream computing. Thus, the difference between M and P images is obtained. The operation can be considered a convolution-like operation; P is shifted as a sliding window over M.

The inventors evaluated the performance of the proposed techniques compared to conventional stochastic computing simulation. First, the inventors evaluated different approaches for performing basic two-input stochastic computing multiplication. Then, the evaluation was extended to the three disclosed image processing techniques. The tests were performed in two separate environments: 1) conventional approach of processing bit-streams and 2) novel CT-based approach. The first case generates and processes actual bit-streams, while the second one operates only on CTs' scalar values. All simulations were carried out with the MATLAB tool.

For the conventional case of processing bit-streams, the inventors simulated the three random sources. Bit-streams were generated with binomial distribution (SCRandom), Sobol-based LD bit-streams (SCSobol), and LFSR-based pseudo-random bit-streams (SCLfsr). For LFSR method, a dynamic and a table-based approach were implemented for generating bit-streams. The dynamic approach algorithmically generates random numbers every time running the simulation. In contrast, in the table-based approach, the random numbers are generated only once, stored in a table, and will be loaded at the run time to compare with the input data and generate corresponding bit-streams. Algorithm 1 (depicted in FIG. 12) and Algorithm 2 (depicted in FIG. 13) illustrate the pseudo-code for the dynamic and table-based simulation of the LFSR-based approach, respectively. Three functions (b2d, bi2de, and bit2int) are explored in MATLAB for the needed binary to decimal (scalar) conversion. The simulations showed that b2d( ) is faster than bi2de( ) and bit2int( ) functions and provides the best runtime. So, for the best performance of the LFSR-based method, the b2d( ) function in used in the simulations. The MATLAB built-in Sobol sequence generator is used for the Sobol-based approach, and for the binomial approach, the MATLAB binornd( ) function is used to generate random numbers. For each of the three methods, we measure the run-time 1000 times and report the average.

Figure 14:
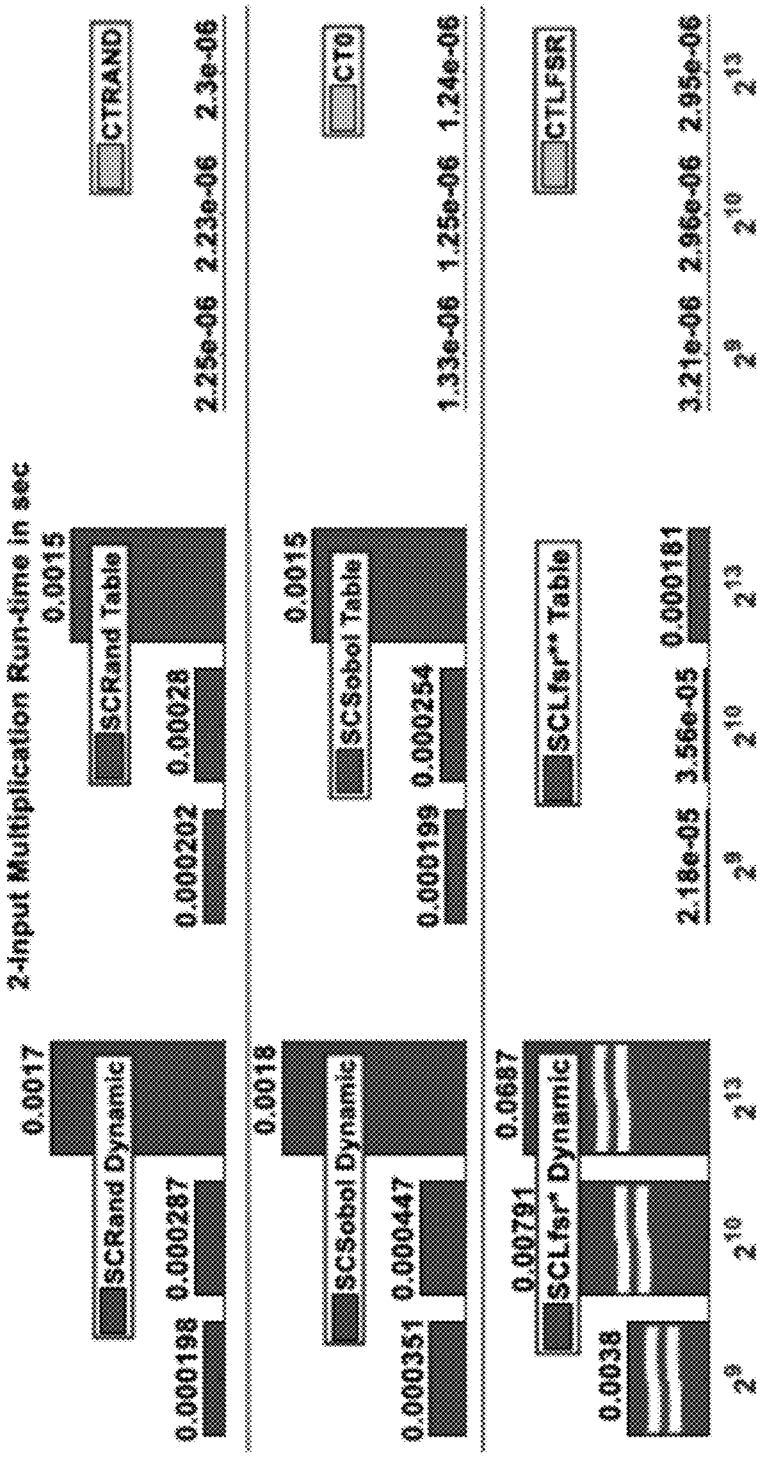
FIG. 14 provides bar graphs of the run-time (in seconds) comparison of different methods for two-input multiplication.

Two-Input Multiplication. FIG. 14 compares the run-time of different methods for basic two-input multiplication. The run-time is reported for different bit-stream sizes (N) to evaluate the scalability of each method. As it can be seen, for most N sizes of all random sources, the table-based approach provides a lower run-time than the dynamic approach. In particular, the LFSR-based method gets the most benefit from loading random numbers from a table as its dynamic simulation involves time-consuming base conversion. Evidently, the run-time increases by increasing the bit-stream length with conventional bit-stream processing. On the other hand, the CT approach shows a constant run-time independent of the bit-stream size. As it can be seen, the CT approach provides significantly shorter run-times compared to the conventional bit-stream processing for all three random source methods. CT0 is the fastest, as fast as binary computing, then CTRAND and CTLFSR come in turn. The slower performance of CTLFSR is due to using hypergeometric distribution that includes several multiplications.

Image Processing Case Studies. Next presented are the simulation results for the proposed image processing methods. The stochastic computing-based template matching is used for a visual-Quick Response (QR)-code. QR codes are widely used in daily life. Textual information is embedded in QR codes using a 2D structure. In QR code recognition processes, after finder (position) pattern localization, finder pattern (FP) coordinates are obtained. This step can be performed using several methods, such as the Hough transform, edge detection, and overlap of the centroids of continuous regions. Here, we use template matching to search K pattern in a QR code I. Due to the increasing interest in QR beautification with background images, logos, and shapes, the experiment generates and uses an aesthetic QR code dataset containing grayscale images instead of full black-white standard QRs and a neural network approach for visual QR code generation. Each generated QR code has 100% detectable patterns by readily-available QR cam scanners.

Figure 15:
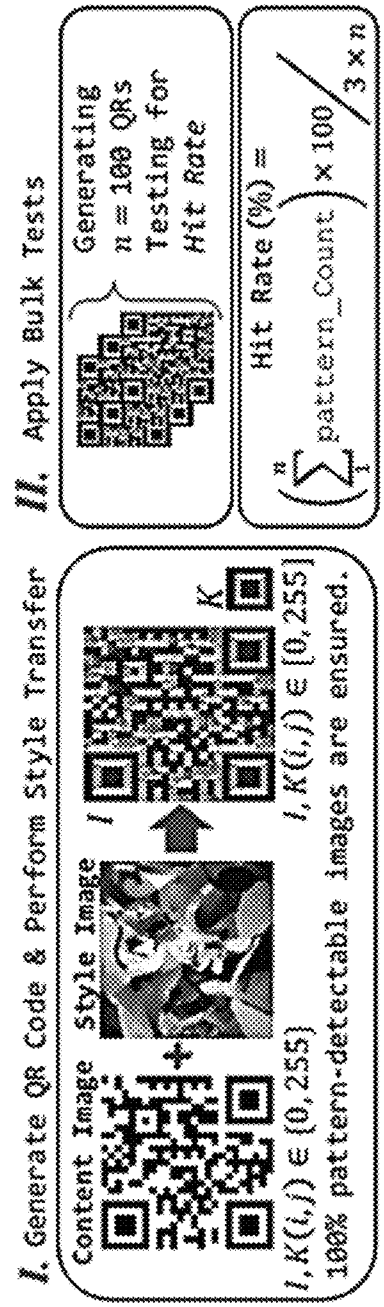
FIG. 15 provides the test environment using style transferred Quick Response (QR)-code.

FIG. 15 shows the flow of the experiment for template matching in QR codes. After generating grayscale stylish QR codes, bulk tests are applied using the template matching methods disclosed herein. The hit rate (HR) indicates the matching percentage in the dataset, considering that each QR code has three finder patterns (FPs). The total pattern_Count indicates cumulative successful pattern matches.

Figure 16:
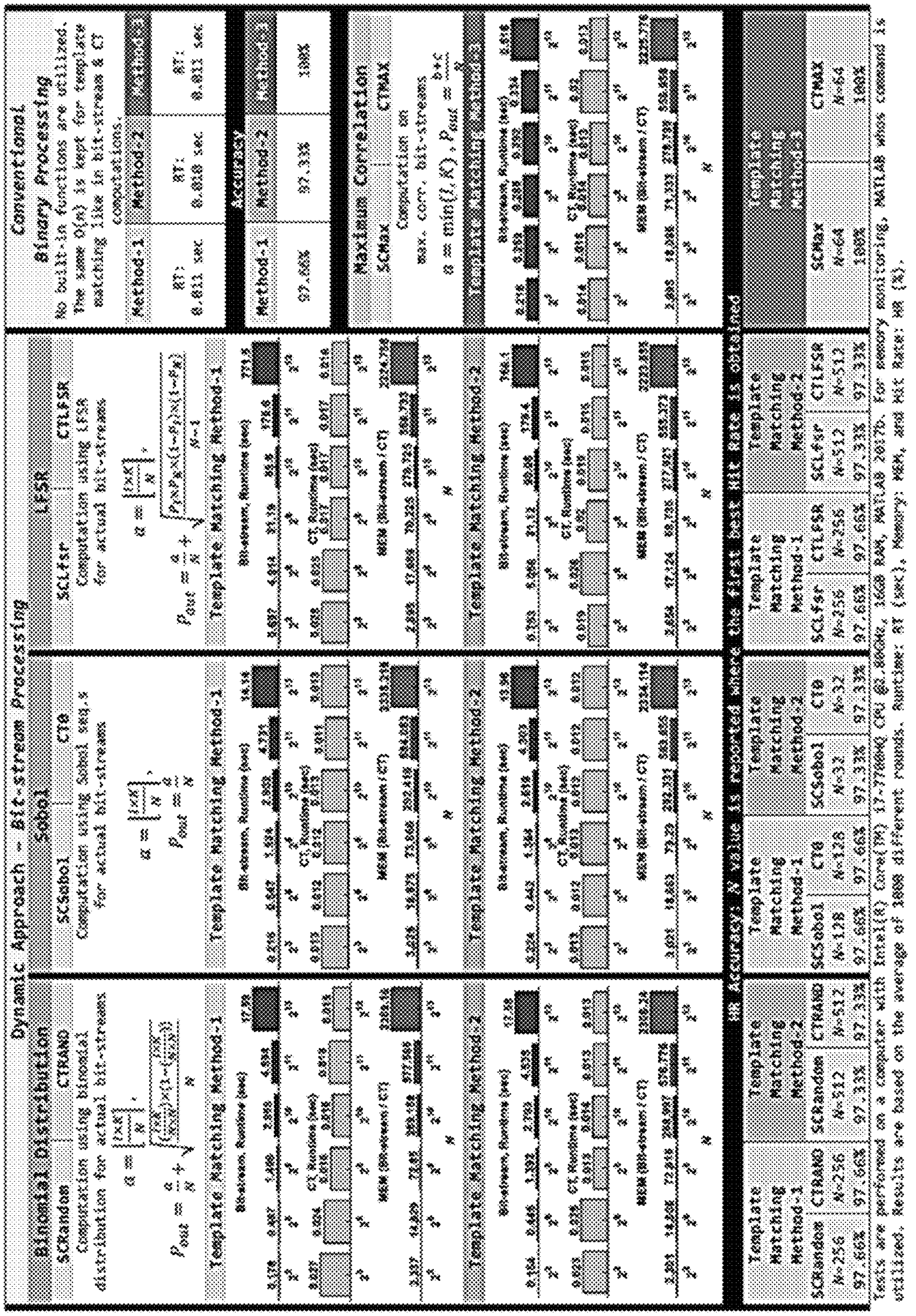
FIG. 16 provides a table of performance comparison of the implemented template matching methods.

FIG. 16 is a table presenting the results for the template matching task. We compare the performance of the three proposed stochastic computing methods for template matching (Method-1, Method-2, Method-3) for processing conventional bit-streams (SCRandom, SCSobol, SCLfsr, SCMax), and the CT approach (CTRAND, CT0, CTLFSR, CTMAX). The runtime (purple bar plots: bit-stream processing, yellow bar plots: CT method) and memory usage (MEM-blue bar plots) are compared for different bit-stream lengths.

We record the HR accuracy of the first N that gives the accuracy of the conventional binary computing (CONVN). For instance, SCRandom with Method-1 reaches 97.66% accuracy with N=256. This accuracy is validated with CONVN for Method-1. The accuracy results in the bottom row of FIG. 15 underscore that the conventional bit-stream processing and the proposed CT-based approach have the same accuracy. The Sobol-based approach achieves the CONVN accuracy with N=32 due to its fast convergence property. Method-1 and Method-2 have comparable accuracy, while Method-3 provides the best accuracy (100%). Compared to conventional bit-stream processing, memory is occupied efficiently with the CT approach, especially when emulating larger bit-stream sizes. Bit-stream processing of Method-3, which uses maximum correlated bit-streams, is relatively faster than Method-1 and Method-2, though it still suffers from high memory usage. FIG. 16 shows that conventional bit-stream processing with the dynamic LFSR approach takes longer run-time compared to the binomial distribution- and Sobol-based approaches.

Figure 17:
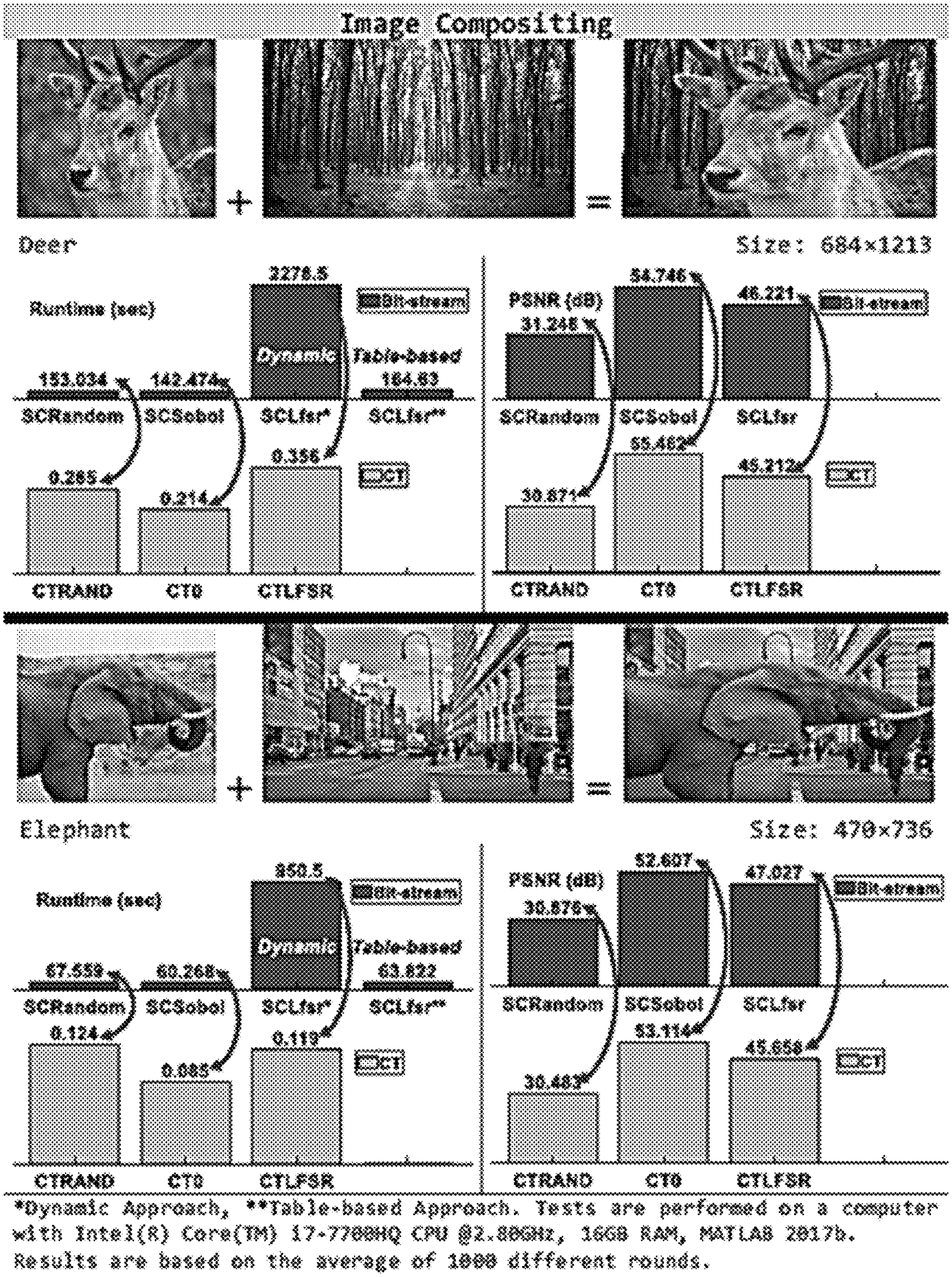
FIG. 17 provides examples of image compositing with different sizes.
Figure 18:
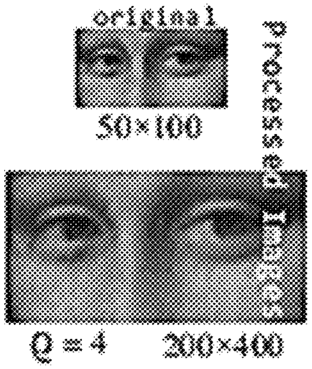
FIG. 18 provides a table of the bilinear interpolation results.

Next evaluated is the performance of the CT approach for the stochastic computing image compositing. FIG. 17 shows two pairs of Background (B) and Foreground (F) images as two different examples. Run-time (RT) in seconds and the output quality in PSNR (peak signal-to-noise ratio) are reported as the performance metrics. Bit-stream size is N=256. As it can be seen from the PSNR values, the CT approach successfully emulates different bit-stream generation methods and provides comparable PSNRs to the bit-stream processing. Comparing different random sources, the Sobol-based method achieves the best PSNRs, then the LFSR method, and finally, the binomial method. The SCRandom and SCSobol run-time results in FIG. 17 are obtained with the dynamic approach (the table-based approach did not significantly reduce the run-time for the binomial- and Sobol-based bit-stream processing). However, the SCLfsr** run-time is obtained using the table-based approach, which is faster than the dynamic SCLfsr* with run-times of 2278.5 sec for the Deer, and 950.5 sec for the Elephant example. In both examples, the CT approach significantly reduces the run-time compared to conventional bit-stream processing.

Finally, the disclosed stochastic computing bilinear interpolation was tested for $\varrho=4$ scaling value. As with other tests, actual bit-stream processing and the CT method are evaluated. The binomial distribution and Sobol-based bit-stream processing are performed via the dynamic method. The table-based approach is used for the LFSR-based bit-stream processing. The results present PSNR values, run-time in seconds, and memory usage, while the bit-stream size is N=256. The results presented in Table 2 are the average of 1000 independent trials. According to the PSNR results obtained with reference to the image produced by the conventional binary calculation (CONVN), all bit-stream processing results are emulated very closely by the CT method. As expected, the Sobol method achieves the best performance, followed by the LFSR and binomial methods. CT-based simulation provides approximately 23 times more efficient memory usage than the conventional bit-streams.

Disclosed herein, in sum, are three new stochastic computing-based image processing designs for template matching, image compositing, and bilinear interpolation tasks. The performance of each design was validated with a new stochastic computing emulation technique based on the CT. The CT method addresses the long latency and the high memory usage bottlenecks in the traditional approach of simulating stochastic computing systems. CT-based simulation especially fits well for image processing applications. The experimental results for simulation of the proposed stochastic computing image processing methods show that the CT method performs more efficiently than the conventional bit-stream processing in both run-time and memory usage. In terms of accuracy (PSNR and HR), CT-based simulation produces results with the same accuracy level as the results from traditional bit-stream processing. The proposed technique can be used for fast and efficient emulation of stochastic computing systems in other applications, such as stochastic computing-based neural network systems.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms “step” and/or “block” or “module” etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. Reference throughout this specification to “one embodiment,” “an embodiment,” or similar language means that a particular feature, structure, or characteristic described in connection with the embodiment is included in at least one embodiment. Thus, appearances of the phrases “in one embodiment,” “in an embodiment,” and similar language throughout this specification may, but do not necessarily, all refer to the same embodiment.

Moreover, the terms “substantially” or “approximately” as used herein may be applied to modify any quantitative representation that could permissibly vary without resulting in a change to the basic function to which it is related.

We claim:

1. A method for processing an input image in a stochastic computing system utilizing at least one multi-level cascaded stochastic computing circuit comprising:

a. establishing one or more contingency tables comprising a 2×2 matrix comprising four primitives, a, b, c, and d;

b. storing the contingency table in a memory in the stochastic computing circuit; and c. processing the input image, comprising the following:

i. combining the input image with an additional image through an image composition process, wherein the image composition process comprises:

aa. providing the input image, comprising a background image (B);

bb. providing an input foreground image (F);

cc. providing a foreground image opacity of the input foreground image (a);

dd. providing a two-input multiplexer;

ee. identifying a probability value of the background image $P_B$;

ff. identifying a probability value of the foreground image $P_F$;

gg. identifying a probability value of the foreground image opacity $P_a$; and hh. generating a composite image by performing the following operations: $P_B\times(1-P_a)+(P_F\times P_a)$, ii. identifying a degree of similarity between the input image and an additional image through a template matching process; and iii. comparing the input image with a comparison image through a pattern comparison process.

2. The method of claim 1, wherein the template matching process comprises:

a. determining a size of the input image, comprising a total amount of pixels, r×c;

b. providing a template, K, wherein said template comprises a kernel that is a subset of the input image;

c. comparing each pixel of the input image with the template;

d. identifying each pixel where the input image pixel and template intersect;

e. generating a temporary matching image; and f. normalizing the temporary matching image.

3. The method of claim 2, wherein generating the temporary matching image comprises by applying Σ f(I, K), wherein/represents the input image; and wherein f(I, K) comprises any one of the following:

a. |I-K|;

b. $(I-K)^2$; and c. I×K.

4. The method of claim 2, further comprising:

a. generating a contingency table for the input image;

b. generating a contingency table for the template;

c. generating the temporary matching image by performing an AND operation on the input image and template, wherein the input image and the template each comprise zero correlated bit streams;

d. decoding the temporary matching image by identifying a population count of 1s, comprising a result ΣI×K;

e. subtracting $K^2$ from the decoding result; and f. identifying an exact template match wherein a result of the foregoing steps generates a zero result.

5. The method of claim 2, further comprising:

a. generating a contingency table for the input image;

b. generating a contingency table for the template;

c. generating the temporary matching image by performing a stochastic computing multiplication operation on the input image and template, wherein the input image and the template each comprise zero correlated bit streams;

d. decoding the temporary matching image by identifying a population count of 1s; and e. identifying a template match wherein a result of the foregoing steps generates a zero result.

6. The method of claim 2, further comprising:

a. generating a contingency table for the input image;

b. generating a contingency table for the template;

c. generating the temporary matching image by performing an XOR operation on the input image and template, wherein the input image and the template each comprise maximally correlated bit streams;

d. decoding the temporary matching image by identifying a population count of 1s; and e. identifying a template match wherein a result of the foregoing steps generates a zero result.

7. The method of claim 1, wherein the pattern comparison process comprises:

a. calculating a maximum a value by applying min (M, P), wherein M represents the input image and P represents the comparison image;

b. setting the maximum a value as an expected a value;

c. calculating b, comprising subtracting a from the input image;

d. calculating c, comprising subtracting a from the comparison image;

e. applying an XOR operation to b and c; and f. determining any differences between the input image and comparison image;

wherein a zero value is obtained when an exact pattern match is present.

8. The method of claim 1, wherein the pattern comparison process comprises:

a. generating the contingency table comprising:

i. providing a plurality of inputs to the contingency table comprising a bit stream length (N), at least two input scalars X1 and X2, and a target correlation;

ii. establishing a range of correlation points for a, wherein said range comprises a minimum a value, a maximum a value, and a zero a value;

iii. calculating the maximum a value by applying min (M, P), wherein M represents the input image and P represents the comparison image;

b. setting the maximum a value as an expected a value;

c. calculating b, comprising subtracting a from the input image;

d. calculating c, comprising subtracting a from the comparison image;

e. applying an XOR operation to b and c; and f. determining any differences between the input image and comparison image;

wherein a zero value is obtained when an exact pattern match is present.

* * * * *